(12) United States Patent
Max et al.

(10) Patent No.: US 11,953,341 B2
(45) Date of Patent: Apr. 9, 2024

(54) COLLECTING OF VEHICLE-BASED, LOCATION-SPECIFIC DATA SET

(71) Applicants: Volkswagen Aktiengesellschaft, Wolfsburg (DE); AUDI AG, Ingolstadt (DE)

(72) Inventors: Stephan Max, Gifhorn (DE); Edson William Fangwa Nzeya, Ingolstadt (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 202 days.

(21) Appl. No.: 17/625,243

(22) PCT Filed: Jul. 7, 2020

(86) PCT No.: PCT/EP2020/069051
§ 371 (c)(1),
(2) Date: Jan. 6, 2022

(87) PCT Pub. No.: WO2021/005025
PCT Pub. Date: Jan. 14, 2021

(65) Prior Publication Data
US 2022/0244073 A1    Aug. 4, 2022

(30) Foreign Application Priority Data
Jul. 8, 2019    (DE) .................... 10 2019 118 387.1

(51) Int. Cl.
*G01C 21/00*    (2006.01)
*G01C 21/34*    (2006.01)

(52) U.S. Cl.
CPC ..... *G01C 21/3889* (2020.08); *G01C 21/3461* (2013.01); *G01C 21/3896* (2020.08)

(58) Field of Classification Search
CPC ............ G01C 21/3889; G01C 21/3896; G01C 21/3461
See application file for complete search history.

(56) References Cited

U.S. PATENT DOCUMENTS 6,684,155 B1 *    1/2004    Chen ..................... B60R 25/102
                                                    340/995.22
9,677,895 B2    6/2017    Schulz
(Continued)

FOREIGN PATENT DOCUMENTS

CN    104737215 A    6/2015    ............... G08G 1/01
DE    19513640 A1    6/1996    ............... G08G 1/01
(Continued)

OTHER PUBLICATIONS

International Search Report and Written Opinion, Application No. PCT/EP2020/069051, 7 pages, dated Oct. 16, 2020.
(Continued)

*Primary Examiner* — Vivek D Koppikar
*Assistant Examiner* — Jeffrey R Chalhoub
(74) *Attorney, Agent, or Firm* — Slayden Grubert Beard PLLC

(57) ABSTRACT

A method and a device for acquiring, offering, and transmitting vehicle-based data of a route section, in particular environment data acquired by a vehicle of a vehicle swarm traveling on the route section and offered to a back-end computer and transmitted if required, comprising: reporting available vehicle-based data relating to the route section currently being traveled on to the back-end computer; requesting at least one selection of the vehicle-based data offered relating to the predefined route section from the vehicle by means of the back-end computer; collecting the requested selection of the vehicle-based data by means of the sensors of the vehicle and storing the data in a memory (Continued)

the vehicle; and transmitting the requested and collected data to the back-end computer.

18 Claims, 1 Drawing Sheet

(56) References Cited

U.S. PATENT DOCUMENTS

| | | | |
|---|---|---|---|
| 9,818,237 B2 | 11/2017 | Iyoda et al. | |
| 10,922,972 B2 | 2/2021 | Max et al. | |
| 2011/0130906 A1* | 6/2011 | Mayer | G07C 5/085 903/903 |
| 2011/0260884 A1* | 10/2011 | Yi | G07C 5/008 340/870.02 |
| 2013/0274950 A1 | 10/2013 | Richardson et al. | 701/1 |
| 2015/0088335 A1 | 3/2015 | Lambert et al. | 701/1 |
| 2015/0332519 A1 | 11/2015 | Hiura et al. | 701/33.4 |
| 2018/0063882 A1 | 3/2018 | Macdonald et al. | |
| 2020/0082710 A1 | 3/2020 | Lang et al. | |

FOREIGN PATENT DOCUMENTS

| | | | | |
|---|---|---|---|---|
| DE | 102011106295 A1 | 1/2012 | | G08G 1/01 |
| DE | 102013215499 A1 | 2/2015 | | B60R 16/023 |
| DE | 102013225497 A1 | 6/2015 | | G01C 21/26 |
| DE | 102016110794 A1 | 12/2016 | | G07C 5/08 |
| DE | 102017119451 A1 | 3/2018 | | B60R 16/023 |
| DE | 102017206363 A1 | 10/2018 | | G08G 1/01 |
| DE | 102017207014 A1 | 10/2018 | | G08G 1/00 |
| DE | 102016003969 B4 | 2/2019 | | B60W 40/06 |
| DE | 102018008730 A1 | 5/2020 | | G08G 1/00 |
| DE | 102019118387 A1 | 1/2021 | | G08G 1/01 |
| WO | 2021/005025 A1 | 1/2021 | | G08G 1/01 |

OTHER PUBLICATIONS

Chinese Search Report, Application No. 202080049732.3, 3 pages, dated Mar. 24, 2023.

* cited by examiner

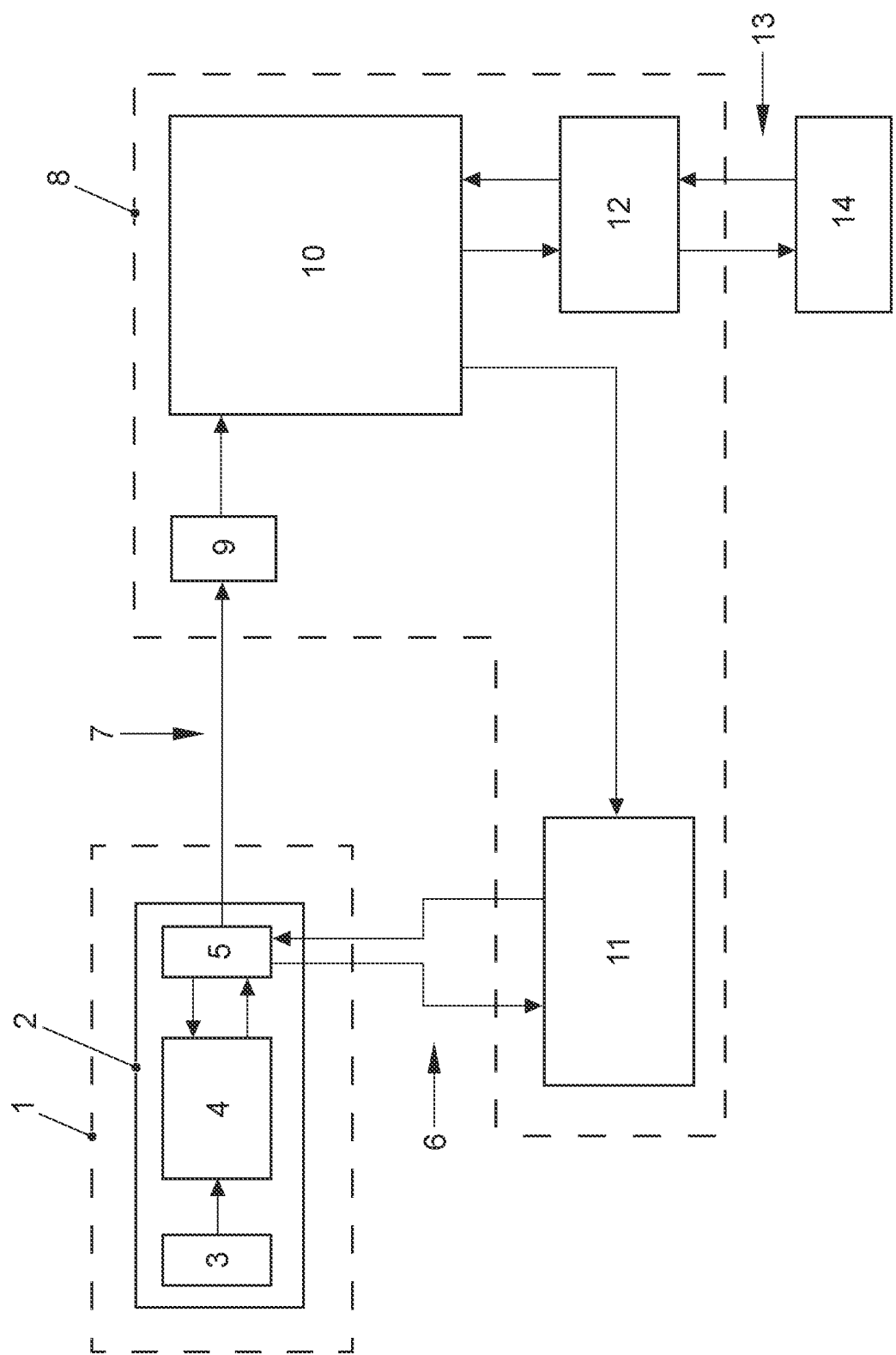

COLLECTING OF VEHICLE-BASED, LOCATION-SPECIFIC DATA SET

CROSS-REFERENCE TO RELATED APPLICATIONS

This application claims priority to German Patent Application No. DE 10 2019 118 387.1, filed on Jul. 8, 2019 with the German Patent and Trademark Office. The contents of the aforesaid patent application are incorporated herein for all purposes.

TECHNICAL FIELD

The invention relates to a method for collecting vehicle-based data, in particular environment data, and transmitting same to a back-end computer, wherein the relevant data sets relate to predefined route sections traveled by a swarm of data-collecting vehicles, and to a corresponding device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In recent years, a variety of interactive electrical series systems have been developed for supporting the driver. The integrated assistance and convenience systems use various sensors to detect the surroundings of the vehicle in order to make driving safer and more convenient, and in this way generate up-to-date data on the surroundings currently being traveled through, i.e., the route section currently being traveled on.

Since the vehicles are already equipped with various sensor systems, it is expedient to collect said data and to use same comprehensively. This trend is being reinforced by two developments. Firstly, systems that were previously offered as an option have become standard on account of the ever more stringent safety requirements of, for example, the European NCAP (New Car Assessment Programme). Secondly, a mobile phone connection has become a legal requirement in some jurisdictions in vehicles due to the need for an electronic emergency call system, the so-called eCall. As a result, the environment data may be collected and communicated directly in a location-based and time-synchronized manner.

In the vehicle itself, data of different classes are recorded. With regard to the surroundings of the vehicle, the data, referred to as vehicle-based data, are subdivided as follows:
 geoinformation, which relate to the geographical phenomena directly and indirectly associated with a position on the Earth,
 traffic data, i.e., a description of the states of all objects involved in the traffic,
 location-based event data, such as sporadically occurring local danger spots, and
 location-based status data, i.e., continuously recordable data such as temperature, parking space occupancy, traffic light status, variable traffic signs, etc.

In previous systems, the data are simply forwarded directly from the vehicle. In the process, data packets were recorded in the vehicle and sent unaltered to a back-end computer. As such, no intelligent handling of the data took place in the vehicle.

SUMMARY

A need exists to improve the service-oriented collection of data and handling of the data recorded by a vehicle.

The need is addressed by methods and by devices having the features of the independent claims. Embodiments of the invention are described in the dependent claims, the following description, and the drawings.

BRIEF DESCRIPTION OF THE DRAWING

FIG. 1 shows an embodiment of service-oriented acquisition and offering of data of a vehicle, which collects environment data, to a back-end computer.

DESCRIPTION

The details of one or more embodiments are set forth in the accompanying drawing and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A method for acquiring, offering, and transmitting vehicle-based data of a route section, in particular environment data acquired by a vehicle of a vehicle swarm traveling on the route section and offered to a back-end computer and transmitted if required, comprises the following steps in a first embodiment:
 reporting available vehicle-based data relating to the route section currently being traveled on to the back-end computer,
 requesting at least one selection of the vehicle-based data offered relating to the predefined route section from the vehicle by means of the back-end computer,
 collecting the requested selection of the vehicle-based data by means of the vehicle in a memory of the vehicle, and
 transmitting the requested and collected data to the back-end computer.

In a second embodiment, the method comprises the following steps:
 reporting available vehicle-based data relating to the route section currently being traveled on to the back-end computer, wherein the measured data are stored in a memory of the vehicle,
 requesting at least one selection of the vehicle-based data offered relating to the predefined route section from the vehicle by means of the back-end computer, and
 transmitting the requested and collected data to the back-end computer.

In each vehicle, data that are required, for example, for corresponding functions of the vehicle or that serve as information for the driver are collected by means of corresponding sensors during travel.

The starting point for the first embodiment above is the case where these data are only collected, i.e., measured, and further used directly in the vehicle. In this case, direct storage does not occur; this is only effected by the back-end computer.

In the second embodiment above of the method, the measured data are stored in a suitable memory of the vehicle at the same time. In this case, the back-end computer does not have to additionally prompt storage in the event that said data are required, but rather the data relating to a predefined route section are fed to said back-end computer from the memory of the vehicle when required.

This allows for service-oriented offering, collection, and transmission of vehicle-based data by the sensors of a vehicle of a vehicle swarm. In the vehicle, data identified as useful are collected and stored in defined memories. Said vehicle-based data are offered as a "service" over a defined period of time to possible functions in the back-end computer that accept said data, wherein the offer is made regardless of possible functions that use said data. Said using functions of the back-end computer are, for example, requests from external users who require the vehicle-based data for predefined route sections, for example in order to find out current traffic conditions on the predefined route sections.

For example, the collected data are transmitted at the request of the back-end computer, which thus manages the timing of the data retrieval. In this way, the vehicle does not act autonomously with regard to the time at which the requested data are transmitted.

In another example, the vehicle reports the availability of the requested data to the back-end computer, which then requests the data or ignores the offer. The timing of the availability of the data is thus related to a location by the vehicle.

In another example, the data collected in the vehicle are deleted after a predefined amount of time. This is done both in the first variant and in the second variant. If the back-end computer has no need for the acquired data in spite of an initial request, for example because the task situation has changed or because sufficient data were already supplied by other vehicles of the swarm, the data are deleted after a certain amount of time, in particular in order to make room for new data, for example. In other words, after a certain amount of time, ideally after the value of the data has temporally expired, the data are deleted or replaced with more up-to-date data.

For example, the deletion time for the collected data that is determined by means of the predefined amount of time is determined based on the storage capacity of the vehicle. In this way, the deletion time is set based on a technical factor, specifically the storage capacity in the vehicle.

In another example, the deletion time for the data that is determined by means of the predefined amount of time is specified to the vehicle by the back-end computer. This either requires a sufficient storage capacity or the storage capacity is known to the back-end computer, such that same may specify a variable deletion time. In particular, the back-end computer may flexibly configure its own capacity utilization by setting the deletion time.

In another example, the vehicle transmits information about the available sensors of the vehicle to the back-end computer when reporting available vehicle-based data and the back-end computer makes a selection of the vehicle-based data based on the available sensors of the vehicle. In this way, the back-end computer may have flexible access to the different sensors of the vehicles and plan and optimally allocate measuring tasks.

In another example, the back-end computer transmits the desired measuring frequency and/or the desired block length of the data to the vehicle. The desired measuring frequency is understood to mean the time intervals at which measurements are to be taken, whereas the block length relates to the number of data sets to be transmitted in the block.

For example, the vehicle logs in to a vehicle management system for communication with the back-end computer upon departure by means of its vehicle identification, wherein the vehicle management system either forms a separate unit or a component of the back-end computer.

A device for acquiring, offering, and transmitting vehicle-based data of a route section, in particular environment data acquired by a vehicle of a vehicle swarm traveling on the route section and offered to a back-end computer and transmitted if required, wherein the device is configured and designed to carry out the method explained above, comprises:

environment sensors for recording vehicle-based environment data,
a data aggregator for storing and arranging the data acquired by the sensors, and
a control apparatus for controlling the data aggregator and for communication of the vehicle with the back-end computer.

For example, the control apparatus comprises a bidirectional channel for communication with a vehicle management system and a unidirectional channel for communication with a data-handling system of the back-end computer. In this way, it may be ensured that a client cannot determine the identity of the measuring vehicle if the vehicle identity is not exchanged between the vehicle management system and the data aggregator of the back-end computer.

Reference will now be made to the drawing in which the various elements of embodiments will be given numerical designations and in which further embodiments will be discussed.

Specific references to components, process steps, and other elements are not intended to be limiting. It is further noted that the FIG. is schematic and provided for guidance to the skilled reader and is not necessarily drawn to scale. Rather, the various drawing scales, aspect ratios, and numbers of components shown in the FIG. may be purposely distorted to make certain features or relationships easier to understand.

FIG. 1 is a schematic representation of the interaction between a vehicle 2 of a vehicle swarm 1 that acquires environment data and a back-end computer 8 on a predefined route section.

A vehicle 2 of the vehicle swarm 1 is traveling on a current route section and generates environment data relating to the relevant route section on which the vehicle 2 is currently traveling by means of suitable sensors 3, for example cameras, lidar, radar, etc. The data generated by the sensors 3 relating to the route section currently being traveled on are supplied to a data aggregator 4, which compiles the data into data sets relating to the route section currently being traveled on and temporarily stores same, wherein a data set of this kind contains, in addition to GPS data for locating the data set in relation to the route section, for example, the measuring time, the vehicle speed, and an identification of the measuring vehicle. Furthermore, the data aggregator 4 may identify the data sets created in this manner according to the measurement method used, in other words, attach to the data sets the information about the sensors generating the relevant data set, i.e., classify the acquired data sets with respect to the sensors.

The vehicle 1 further comprises a control apparatus 5, which, in addition to the task of controlling the data aggregator 4, also has the task of providing communication of the vehicle 2 with external apparatuses by radio link. In particular, communication takes place with an external back-end computer 8 via the control apparatus 5, wherein, in order to communicate with the back-end computer 8, the vehicle 2 for example logs in to a vehicle management system 11 of the back-end computer 8 upon departure via a bidirectional communication channel 6, which vehicle management system controls the bidirectional communication of the vehicle 2 with the back-end computer 8. The vehicle management system 11 of the back-end computer 8 may then send a login confirmation and, if applicable, other information or instructions of the back-end computer 8 to the control apparatus 5 of the vehicle 2.

In addition to the vehicle management system 11 for communication of the back-end computer 8 with the relevant vehicle 2 of the vehicle swarm 1, there is another, unidirectional transmission channel 7 between the control apparatus 5 of the vehicle 2 and the back-end computer 8 by means of a communication apparatus 9 of the back-end computer 8, wherein the transmission of data sets acquired in the vehicle 2 to the back-end computer 8, in particular, takes places via the unidirectional communication channel 7. Furthermore, requests or other information may be transmitted to the back-end computer 8 via the unidirectional channel 7.

Communication of the vehicle 2 with the back-end computer 8 is split into these two channels 6, 7 in order to anonymize the data sets acquired by the vehicle 2, since, for example, the vehicle management system 11 obtains the real identification number of the vehicle 2 when the vehicle 2 logs in and a virtual identification number is assigned by the vehicle management system 11 to the vehicle 2 for transmitting the measured data sets to the back-end computer 8 via the unidirectional channel 7, such that only the vehicle management system 11 has knowledge of the real identity of the vehicle 2 and does not forward this knowledge to other instances of the back-end computer 8. In particular, in order to increase the anonymity of the vehicle 2 and of the data sets, the vehicle management system 11 may also be decoupled from the back-end computer 8 and be operated as a stand-alone external unit.

The data sets transmitted by the control apparatus 5 of the vehicle via the data channel 7 are received by the communication apparatus 9 of the back-end computer 8, where they are converted into a format that is compatible with the back-end computer 8, if necessary, in order to ensure an optimal workflow in the back-end computer 8. Subsequently, the data sets of the vehicle 2 of the vehicle swarm 1 are supplied to the data management system 10 of the back-end computer 8, wherein the data management system 10 is also referred to as the data-handling system.

The data management system 10 also manages the tasks directed at a user interface 12 of the back-end computer 8 by an external user 14 or client via a bidirectional communication channel 13. For example, a user 14 would like to know the traffic volume for a predefined route section in a measuring cycle that recurs on an hourly basis, wherein a minimum size of a vehicle swarm 1 is required in order to be able to determine the traffic density in a route section based on distance measurements between the vehicle 2 supplying the data and the vehicles in its surroundings and based on their relative speeds and on the speed of the vehicle 2 itself. The vehicle 2 of the swarm 1 generating the data therefore supplies data sets containing distances from other vehicles, relative speeds, and its own speed as a function of the position and the time, from which the data management system 10, which may also be referred to as the data-handling system, determines the traffic volume and transmits same to the client 14 via the communication interface 12. Another task may for example relate to the road condition of predefined sections, in order to establish whether the roadway is dry, wet, snowy, or icy. As such, different tasks may obviously relate to different circumstances for predefined route sections, such that information from different sensors of the vehicles 2 of the vehicle swarm 1 may be requested.

In other words, all data identified as potentially useful are collected by the environment sensors 3 in the vehicles 2 of the swarm 1 and stored in defined memories of the data aggregator 4. Said data are offered as a "service" to possible functions that accept said data in the back-end computer 8 over a defined period of time. This offer takes place regardless of possible functions that use said data. After a certain amount of time, ideally after the value of the data has temporally expired, the data in the data aggregator 4 are deleted or replaced with more up-to-date data.

The "service-oriented offering" of data by a vehicle 2 after it has logged in to the back-end computer 8 via the vehicle management system 11 thus proceeds as follows:

The vehicle 2 reports available sensor data for a current route section and thus the type of sensors to the data-handling system 10 of the back-end computer 8, which communicates its requests or data wishes to the control apparatus 5 of the vehicle 2 via the vehicle management system 11, i.e. a selection of the signals available in the vehicle 2, a selection of the measuring frequency and, if applicable, a selection of the block length, i.e. how many different data sets are to be compiled into a block that is then to be transmitted, the vehicle 2, in response to the requests of the back-end computer 8, collects data according to the task and stores said data in the data aggregator 4, the collected data are sent to the data-handling system 10 of the back-end computer 8 via the transmission channel 7 at the request of the back-end computer 8, or the vehicle 2 reports to the back-end computer 8 that data appropriate for the task are available and then the back-end computer 8 requests said data, and the deletion time of the data collected in the data aggregator is either defined by means of the storage limit or a deletion time specified by the back-end computer 8, such that data not requested in this manner expire in the vehicle 2.

LIST OF REFERENCE NUMERALS

1 Vehicle swarm
2 Vehicle
3 Environment sensors of the vehicle
4 Data aggregator of the vehicle
5 Control apparatus/communication apparatus
6 Communication channel
7 Transmission channel
8 Back-end computer
9 Communication apparatus
10 Data-handling system/task management system
11 Vehicle management system
12 Interface between back-end computer and client
13 Communication channel
14 Client/user The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A computer-implemented method for acquiring, offering, and transmitting vehicle-based sensor data of a route section, wherein the vehicle-based sensor data includes environment data acquired by a vehicle of a vehicle swarm traveling on the route section and offered to a back-end computer, comprising:
reporting, by a control circuit of the vehicle, available types of vehicle-based sensor data relating to the route section currently being traveled on to the back-end computer;
receiving, from the back-end computer, a request for at least one selected type of vehicle-based sensor data selected from the available types of vehicle-based sensor data reported by the control circuit of the vehicle, the request specifying at least one of a requested measuring frequency or a requested block length of at least one selected type of vehicle-based sensor data;
in response to the received request for the at least one selected type of vehicle-based sensor data, collecting, by at least one sensor associated with the at least one selected type of vehicle-based sensor data, vehicle-based sensor data in a memory of the vehicle; and
transmitting the requested and collected vehicle-based sensor data to the back-end computer.

2. A computer-implemented method for acquiring, offering, and transmitting vehicle-based sensor data of a route section, wherein the vehicle-based sensor data includes environment data acquired by a vehicle of a vehicle swarm traveling on the route section and offered to a back-end computer, comprising:
reporting, by a control circuit of the vehicle, available types of measured vehicle-based sensor data relating to the route section currently being traveled on to the back-end computer, wherein the measured vehicle-based sensor data are stored in a memory of the vehicle;
receiving, from the back-end computer, a request for at least one selected type of measured vehicle-based sensor data selected from the available types of measured vehicle-based sensor data reported by the control circuit of the vehicle, the request specifying at least one of a requested measuring frequency or a requested block length of the at least one selected type of measured vehicle-based sensor data;
in response to the received request for the at least one selected type of measured vehicle-based sensor data, collecting from the memory of the vehicle, measured vehicle-based sensor data of the at least one selected type of measured vehicle-based sensor data; and
transmitting the requested and collected measured vehicle-based sensor data to the back-end computer.

3. The method of claim 1, wherein the requested and collected vehicle-based sensor data are transmitted at the request of the back-end computer.

4. The method of claim 1, wherein the vehicle reports the availability of the requested and collected vehicle-based sensor data to the back-end computer, which requests the vehicle-based sensor data or ignores the report from the vehicle.

5. The method of claim 1, wherein the vehicle-based sensor data collected in the vehicle are deleted in the vehicle after a predefined amount of time.

6. The method of claim 5, wherein the deletion time for the vehicle-based sensor data that is determined by the predefined amount of time is determined on the basis of a storage capacity of the vehicle.

7. The method of claim 5, wherein, in the event the back-end computer no longer needs the requested vehicle-based sensor data, the deletion time for the vehicle-based sensor data that is determined by the predefined amount of time is specified to the vehicle by the back-end computer.

8. The method of claim 1, wherein the vehicle transmits information about available sensors of the vehicle to the back-end computer when reporting the available types of vehicle-based sensor data and the back-end computer makes a selection of the available types of vehicle-based sensor data based on the available sensors.

9. The method of claim 1, wherein the vehicle logs in to a vehicle management system for communication with the back-end computer upon departure using its vehicle identification, wherein the vehicle management system either forms a separate unit or a component of the back-end computer.

10. A device for acquiring, offering, and transmitting vehicle-based sensor data of a route section, wherein the vehicle-based sensor data includes environment data acquired by a vehicle of a vehicle swarm traveling on the route section and offered to a back-end computer, comprising:
environment sensors for recording vehicle-based sensor data;
a data aggregator for storing and arranging the vehicle-based sensor data acquired by the environment sensors; and
a vehicle-based control circuit for controlling the data aggregator and for communication with the back-end computer, the control circuit configured to:
report available types of vehicle-based sensor data relating to the route section currently being traveled on to the back-end computer;
receive, via a bidirectional communication channel between the vehicle-based control circuit and the back-end computer, a request from the back-end computer for at least one selected type of vehicle-based sensor data selected from the available types of vehicle-based sensor data;
in response to the received request for the at least one selected type of vehicle-based sensor data, control the data aggregator to collect and aggregate vehicle-based sensor data collected by at least one of the environment sensors associated with the at least one selected type of vehicle-based sensor data; and
transmit, via a unidirectional communication channel between the vehicle-based control circuit and the back-end computer, the requested and collected vehicle-based sensor data to the back-end computer, wherein the unidirectional communication channel is distinct from the bidirectional communication channel.

11. The method of claim 2, wherein the requested and collected vehicle-based sensor data are transmitted at the request of the back-end computer.

12. The method of claim 2, wherein the vehicle reports the availability of the requested and collected vehicle-based sensor data to the back-end computer, which requests the vehicle-based sensor data or ignores the report from the vehicle.

13. The method of claim 2, wherein the vehicle-based sensor data collected in the vehicle are deleted in the vehicle after a predefined amount of time.

14. The method of claim 3, wherein the vehicle-based sensor data collected in the vehicle are deleted in the vehicle after a predefined amount of time.

15. The method of claim 4, wherein the vehicle-based sensor data collected in the vehicle are deleted in the vehicle after a predefined amount of time.

16. The method of claim 13, wherein the deletion time for the vehicle-based sensor data that is determined by the predefined amount of time is determined on the basis of a storage capacity of the vehicle.

17. The method of claim 13, wherein the deletion time for the vehicle-based sensor data that is determined by the predefined amount of time is specified to the vehicle by the back-end computer.

18. The method of claim 2, wherein the vehicle transmits information about available sensors of the vehicle to the back-end computer when reporting the available types of vehicle-based sensor data and the back-end computer makes a selection of the available types of vehicle-based sensor data based on the available sensors.

* * * * *